US007226663B2

(12) United States Patent
Jiao et al.

(10) Patent No.: US 7,226,663 B2
(45) Date of Patent: Jun. 5, 2007

(54) METHOD FOR SYNTHESIZING NANOSCALE STRUCTURES IN DEFINED LOCATIONS

(75) Inventors: Jun Jiao, Beaverton, OR (US); David W. Tuggle, Portland, OR (US); Lifeng Dong, Portland, OR (US); Sean Foxley, Chicago, IL (US)

(73) Assignee: State of Oregon acting by and through the State Board of Higher Education on behalf of Portland State University, Portland, OR (US)

( * ) Notice: Subject to any disclaimer, the term of this patent is extended or adjusted under 35 U.S.C. 154(b) by 0 days.

(21) Appl. No.: 10/522,850

(22) PCT Filed: Jul. 31, 2003

(86) PCT No.: PCT/US03/24070

§ 371 (c)(1),
(2), (4) Date: Jan. 28, 2005

(87) PCT Pub. No.: WO2004/012932

PCT Pub. Date: Feb. 12, 2004

(65) Prior Publication Data

US 2005/0260453 A1 Nov. 24, 2005

Related U.S. Application Data

(60) Provisional application No. 60/400,897, filed on Aug. 1, 2002.

(51) Int. Cl.
*B32B 9/00* (2006.01)

(52) U.S. Cl. .................................................. 428/408
(58) Field of Classification Search ................ 428/408; 423/445 R; 427/448; 977/DIG. 1; 73/105
See application file for complete search history.

(56) References Cited

U.S. PATENT DOCUMENTS

| 5,926,239 | A | * | 7/1999 | Kumar et al. .................. 349/69 |
| 5,935,454 | A | * | 8/1999 | Tada et al. .................... 216/41 |
| 6,146,227 | A | * | 11/2000 | Mancevski .................... 445/24 |
| 6,297,063 | B1 | * | 10/2001 | Brown et al. .................. 438/2 |
| 6,346,189 | B1 | * | 2/2002 | Dai et al. .................... 205/766 |
| 6,401,526 | B1 | * | 6/2002 | Dai et al. ..................... 73/105 |
| 6,457,350 | B1 | * | 10/2002 | Mitchell ...................... 73/105 |
| 6,504,292 | B1 | * | 1/2003 | Choi et al. ................... 313/310 |
| 6,831,017 | B1 | * | 12/2004 | Li et al. ...................... 438/694 |
| 6,871,528 | B2 | * | 3/2005 | Schlaf et al. ................. 73/105 |
| 6,914,372 | B1 | * | 7/2005 | Akiyama et al. ........... 313/309 |

OTHER PUBLICATIONS

International Search Report from International Application No. PCT/US2003/024070.

* cited by examiner

*Primary Examiner*—John J. Zimmerman
*Assistant Examiner*—Daniel Miller
(74) *Attorney, Agent, or Firm*—Klarquist Sparkman, LLP

(57) ABSTRACT

A method is disclosed for directly synthesizing nanoscale structures, particularly in defined locations. The method overcomes problems in nanoscale manufacturing by enabling the direct fabrication of composites useful for constructing electronic devices. In one aspect of the method, nanotubes and arrays of nanotubes are synthesized directly at defined locations useful for constructing electronic devices.

30 Claims, 6 Drawing Sheets

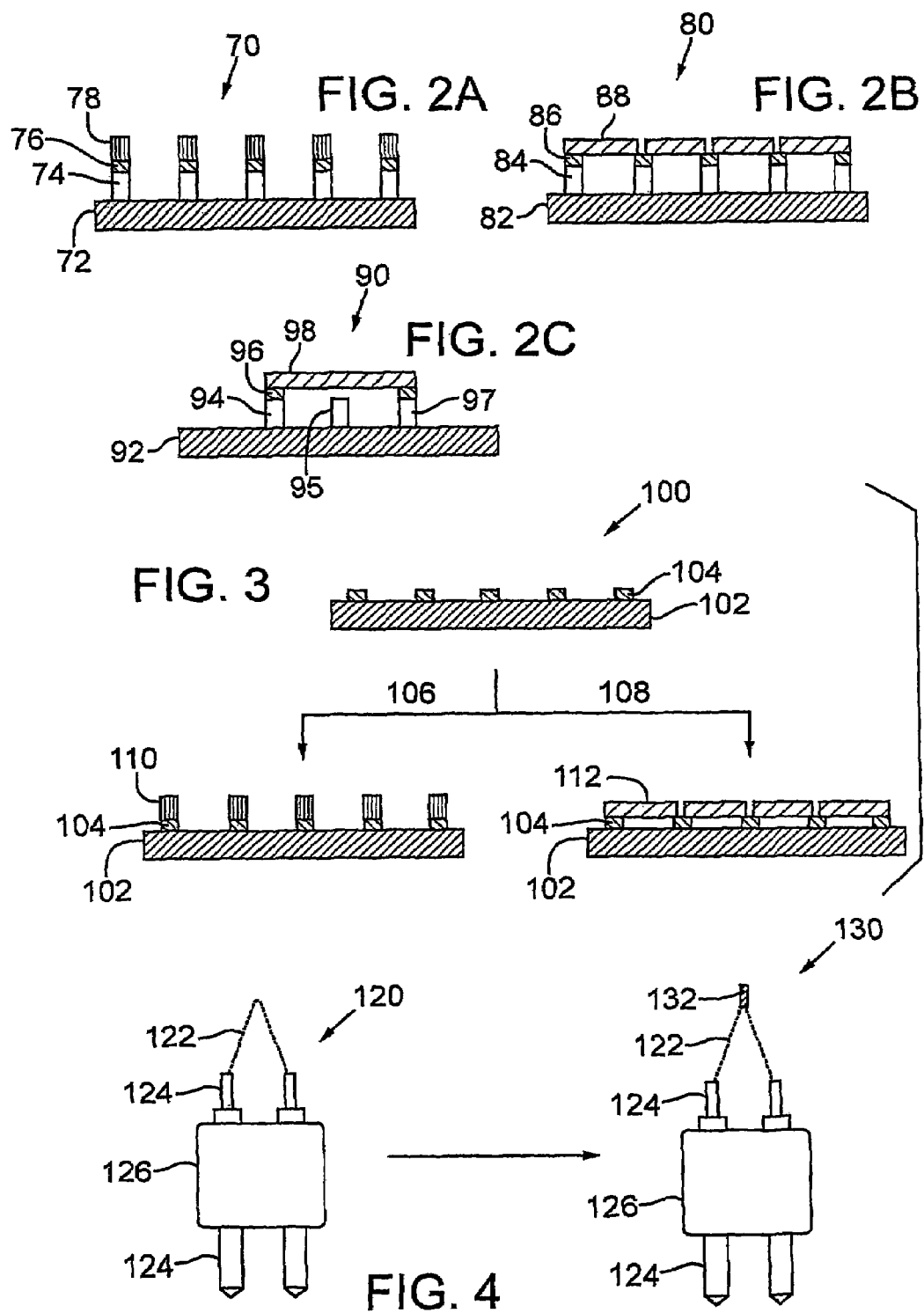

METHOD FOR SYNTHESIZING NANOSCALE STRUCTURES IN DEFINED LOCATIONS

CROSS REFERENCE TO RELATED APPLICATIONS

This is the U.S. National Stage of International Application No. PCT/US2003/024070, filed Jul. 31, 2003, which was published in English under PCT Article 21(2). This application claims the benefit of the earlier filing date of U.S. provisional application number 60/400,897, filed Aug. 1, 2002, which is incorporated herein by reference.

ACKNOWLEDGEMENT OF GOVERNMENT SUPPORT

This invention was made in part using funds provided by the National Science Foundation Grant Nos. DMR-0097575 and ECS-0217061. The United States government may have certain rights in this invention.

FIELD

This disclosure concerns a method for synthesizing nanoscale structures in defined locations, and composites and devices comprising nanoscale materials.

BACKGROUND

Since their discovery in 1991 by microscopist Sumio Iijima, carbon nanotubes have intrigued researchers with their structures and the applications enabled by their unique physical properties. Iijima, S. *Nature,* 1991, 354, 56. Nanotubes exhibit high chemical resistance and mechanical strength, among other desirable physical properties. Ongoing challenges to exploiting these desirable properties include difficulties associated with isolating and manipulating nanotubes for use as discrete device elements.

I. Carbon Nanotubes

Carbon nanotubes are graphene cylinders that can be capped at either end with a fullerene-like structure. When he discovered nanotubes, Iijima was analyzing materials formed at the cathode during arc discharge synthesis of fullerenes and observed a variety of related structures, including novel, closed graphitic structures, such as nanotubes and nanoparticles. Since Iijima's initial discovery, carbon nanotubes have attracted considerable interest from the scientific community, and have prompted much research into their potential applications. Research also has been directed to other nanoscale materials, including inorganic tubular materials, such as silicon carbide and tungsten sulfide nanotubes. However, the difficulties in manipulating individual nanoscale structures, such as nanotubes and connecting such structures to other materials remains a challenging obstacle to achieving practical applications of these intriguing materials.

II. Applications of Nanotubes

Generally, known methods for synthesizing nanotubes provide only unorganized, tangled nanotubes and bundles of nanotubes. These bulk materials are useful as additives for improving the material properties of polymer or metal composites. See, U.S. Pat. No. 6,280,697, issued to Zhou, et al. (Zhou). Zhou describes using bulk carbon nanotubes with intercalated lithium ions to improve the performance of lithium ion batteries. U.S. Pat. No. 6,420,293, issued to Chang, et al. (Chang), describes using nanotubes in bulk as a filler material in ceramic metal oxides to enhance the ceramic's mechanical strength. Despite promising properties and successes using nanotubes as a bulk material, the difficulties in localizing and organizing nanotubes have limited the fabrication of functional devices using nanotube components.

III. Focused Ion Beam

Focused ion beam (FIB) systems have been manufactured commercially for about fifteen years, and primarily are used for semiconductor failure analysis and device edit. FIB systems are similar to scanning electron microscopy (SEM) systems except that FIB systems use a finely focused beam of ions, such as gallium ions, instead of electrons. FIB systems can be used for microscopy, micromachining and deposition processes. More recently, dual-beam systems, including both an electron beam (EB) column and a FIB column, have been developed. EB has a smaller beam spot size than FIB, which allows the imaging of more detailed features than FIB. See *High Resolution Focused Ion Beams: FIB and Its Applications;* by Orloff, J., Utlaut, M., Swanson, L. Kluwer Academic/Plenum Publisher: New York, Boston, Dordrecht, London, Moscow; 2002, which is incorporated herein by reference.

SUMMARY

A method is disclosed for fabricating nanoscale materials, such as nanotubes, in defined locations. Also disclosed are electronic devices fabricated according to embodiments of the method. In one embodiment of the method, a catalytic material is directly deposited on a substrate using FIB-induced deposition. Nanoscale materials can then be synthesized only at the sites having catalyst. In another aspect of the method, a material, such as a conducting, semiconducting or insulating material, is deposited on the substrate at defined locations prior to catalyst deposition. Catalytic material can then be deposited selectively on the first deposited material, and nanoscale material can be synthesized selectively in a pattern defined by the catalyst location. FIB milling can be used in conjunction with EB-induced and/or FIB-induced deposition to refine deposited features, or can be used following non-selective deposition to provide a desired pattern.

Particular materials that can be deposited include, without limitation W, Pt, Au, Al, Fe, Ni, Co, Ti, Ta, Cu, and combinations thereof A particularly useful metal for practicing disclosed embodiments of the present method for fabricating electronic devices is Pt. A second metal that is particularly useful for fabricating a nanotube field emitter device is W. Exemplary useful metal catalysts and catalyst precursors include Fe, Ni, Co or their combinations.

The structures synthesized can be any nanoscale structures, such as nanowires, nanotubes, nanocoils or nanobelts. The nanoscale structures typically contain a material such as zinc oxide, silicon dioxide, tungsten oxide, cadmium sulfide, carbon, silicon carbide, or a combination thereof. Nanotubes, for example, can be any type of nanoscale tubular materials, such as carbon nanotubes, silicon carbide nanotubes, tungsten sulfide nanotubes and other inorganic nanotubes. In one aspect the nanotubular structures are solid materials, for example as wires or filaments. Such solid materials, including nanowires, can be made from zinc oxide, silicon dioxide, tungsten oxide, cadmium sulfide, carbon, silicon carbide, or a combination thereof. Additionally,, the nanotubes can be single-walled or multi-walled, and can be synthesized so that they are oriented in any direction. For example, one composite prepared included a substantially horizontal nanotube connecting two metal pillars. This type of composite is useful as a two terminal device. Another composite included a substantially vertical nanotube. An array containing such substantially vertical nanotubes is useful for forming a field emission device.

One aspect of the method involves synthesizing a nanotube in direct electrical contact with an electronic component. For example, nanotubes can be synthesized directly on a conducting or semiconducting electrode. Thus, an electrical connection is provided to the nanotubes without need for tedious manipulation of nanoscale components. For example, a metal pillar can function as a conductive contact and can connect the nanotube to a device or device component on a substrate. In another embodiment, a device having at least two terminals can be fabricated. Particular examples of such devices include diodes, triodes, optoelectronic devices, acoustic wave devices, electromechanical resonators, and transistors. In an embodiment of a transistor, a source can be provided by depositing a metal pillar on a substrate. A catalytic material can be deposited or patterned according to the present method, such that a nanotube can be synthesized with a first end contacting the pillar and extending substantially horizontally so that a second end contacts a second pillar. The first pillar provides a source connection and the second pillar is connected to the second end of the nanotube, thereby providing a drain connection. The transistor can be switched using a field effect gate, which also can be fabricated according to the present disclosure. Alternatively, because substantially vertical nanotubes can be prepared according to embodiments of the method, a transistor can be fabricated using a substantially vertical nanotube.

In another aspect of the method nanotube composites that function as field emitters can be prepared. Embodiments of the method are useful for preparing defined arrays of nanotube field emitters. Arrays having substantially vertically aligned nanotubes are particularly useful for preparing field emission devices suitable for use, for example, in a flat panel display. Such field emitters can be assembled by patterning pillars on a substrate and then patterning a catalytic material, so that catalytic material resides on top of the pillars. Nanotubes can then be synthesized on the pillars. Each pillar bearing a nanotube, or cluster of nanotubes, can then serve as an independent field emitter and provide a single pixel in a flat panel display. Alternatively, a single pixel can comprise a cluster of pillars bearing nanotubes. The array of individual nanotube field emitters may be formed on a substrate of any size; the upper limit of such an array is only limited by the size of the chamber used for nanotube synthesis.

Another embodiment of a nanotube field emitter device is useful as a monochromatic electron source. In this device, a nanotube serves as a high brightness field emission cathode. This device can be made by synthesizing a nanotube, such as a carbon nanotube, typically a multi-walled carbon nanotube, directly on a metal tip, examples of which include W, Pt, Au, Al, Fe, Ni, Co, Ti, Ta, Cu, alloys thereof, and combinations thereof Such metal tips can be fabricated according to the present method by FIB-induced deposition and/or patterning the metal such that the metal tip typically has a diameter of about 1 µm or less. Tungsten is a preferred metal for fabricating high-brightness, nanotube field emitters, where the tungsten metal tip serves as a substrate hosting a carbon nanotube. This type of field emitter is useful, for example, as an electron source in a field emission microscope.

BRIEF DESCRIPTION OF THE DRAWINGS

FIG. 2A is a schematic illustrating one embodiment of a defined array of substantially vertical nanotubes.

FIG. 2B is a schematic illustrating one embodiment of substantially horizontal nanotubes synthesized in defined locations.

FIG. 2C is a schematic of a transistor formed using a nanotube.

FIG. 3 is a schematic illustrating direct deposition of catalytic material in defined locations on a substrate, followed by nanotube synthesis.

FIG. 4 is a schematic illustrating assembly of one example of a nanotube field emitter device.

DETAILED DESCRIPTION

Figure 1:
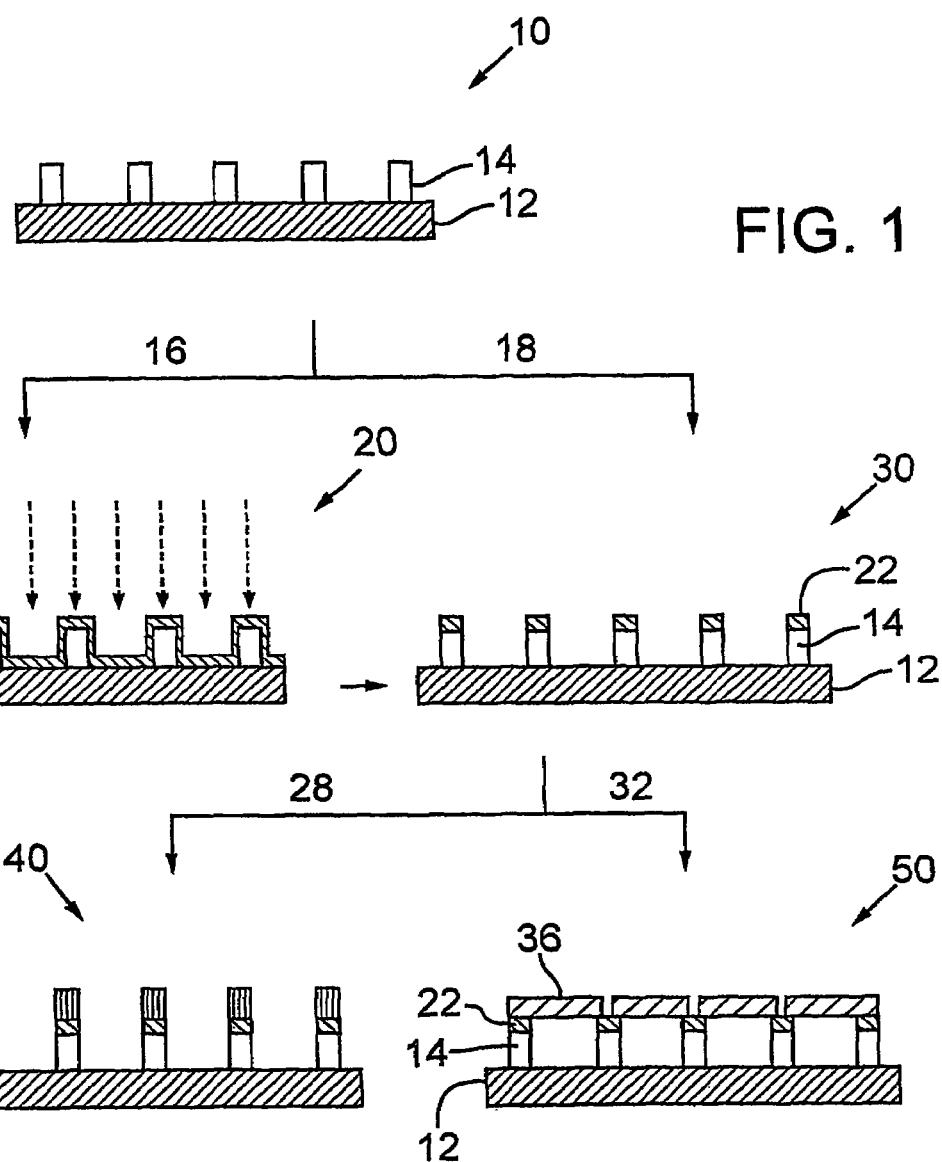
FIG. 1 is a schematic illustrating a process for synthesizing arrays of nanotubes in defined locations.

Embodiments of the present disclosure concern a method for fabricating new, composite materials by synthesizing nanotubes in defined locations, and devices made by the method. Synthesizing nanotubes in defined locations facilitates production of devices that exploit their unique properties.

Another method for synthesizing nanotubes is disclosed by U.S. Pat. No. 6,346,189, issued to Dai, et al. (Dai '189). Dai '189 discloses the synthesis of nanotubes on "catalyst islands" on a substrate. The method disclosed by Dai '189 produces catalyst islands according to a multi-step procedure that uses e-beam lithography to produce a patterned resist. A catalyst is then deposited using the patterned resist to define sites of catalyst deposition and a "lift-off" procedure is performed to remove the resist.

Another method is disclosed by U.S. Pat. No. 6,457,350 to Mitchell (Mitchell), which teaches a technique for placing a nickel catalyst on the tip of a pointed tungsten wire by directional deposition and anisotropic etching. Mitchell teaches that such structures are useful for scanning probe microscopy.

An example of a micromanipulation method is taught by Fransen et al. *Appl. Surf. Sci.* 1999, 146, 312–327 (Fransen). Fransen discloses a manual method using carbon glue and micromanipulators for placing a carbon nanotube on the side of a tungsten tip to make a field emission device.

In contrast, the present disclosure describes an efficient method for synthesizing nanotubes in defined locations via direct patterning and/or deposition of catalytic materials without using lithography or resist patterning and removal procedures. Moreover, embodiments of the disclosed method enable the deposition of other materials, particularly materials that are useful in forming electronic device components. For example, in one embodiment, a first material, such as a conducting or semiconducting material is deposited in defined locations, followed by the deposition of a catalytic material on the first material. Nanotubes are synthesized at the sites having catalyst, thereby forming an electrical connection suitable for fabricating a nanotube-based electronic device, such as a field emitter, diode or transistor.

In particular examples, the first deposited material discussed above is deposited to form a pillar on a substrate. "Pillar" is defined herein as any localized, deposited material. Pillars can be formed in any size, any geometric shape, and any pattern, with the lower size limit being determined by the focused beam spot size of the FIB or electron beam system. For example, material can be deposited with a lateral dimension of less than about 50 nm. The upper size limit is, bounded solely by the deposition rate and commercial need. The vertical height of pillars is readily controlled as is known to those of ordinary skill in the art by controlling the rate of deposition by varying beam current, dwell time and flow of gaseous precursor with the time of deposition at a given rate determining the vertical height.

Pillars can be deposited and/or patterned to provide a defined array of pillars on the substrate. Alternatively, pillars may be formed according to an existing pattern on the substrate, such as a pattern defined by electronic circuitry formed on the substrate. Thus, a pillar can provide an electrical connection between a nanotube and an electronic device.

Catalytic materials can be deposited on a substrate having pillars by any method, and then patterned such that the catalytic material is localized on the pillars. In another aspect of the method, catalytic material is deposited directly by FIB-induced deposition. After FIB-induced deposition, the catalytic material optionally can be patterned to further define catalytic sites and define sites of nanotube synthesis. Thus, nanotubes can be synthesized in defined locations, as determined by the patterning process.

In general, the term "catalytic material" is used to refer to catalysts and catalyst precursors for nanotube synthesis.

FIG. 1 illustrates a first step in an embodiment for synthesizing a structure 10 having nanotubes in defined locations. Structure 10 includes a substrate 12 having pillars 14 deposited on the surface. Substrate 12 can be any solid material, and typical substrates include materials such as silicon, silicon nitride, glass, ceramics, plastics, insulating oxides, semiconductor materials, quartz, mica, metals, and combinations thereof Pillars 14 can include insulating, semiconducting or conducting material and can be deposited and shaped by any method. Suitable methods for depositing such materials include photolithography, EB-induced and FIB-induced deposition. Working embodiments used FIB-induced deposition, and in particular examples FIB milling of deposited material was used to further refine the location, shape and size of deposited material. Pillars can be formed by directly depositing a metal in a defined location, or pillars can be formed by micromachining of a material on the substrate. FIB-induced deposition of gaseous metal precursors can be used to directly deposit a metal at a defined location. Similarly, FIB can be used to micromachine a metal on the substrate to give pillars of a desired size at defined locations.

Using FIB and/or EB techniques, gaseous precursors can be used to deposit a variety of useful metals on a substrate, such as those selected from the group consisting of Al, Au, Fe, Ni, Co, Pt, W, and combinations thereof. Gaseous precursors for EB- and FIB-induced deposition are known to those of ordinary skill in the art. Gaseous precursors can be selected from the group of gaseous or vaporizable materials that deposit a desired catalytic, insulative, semiconductive, or conductive material upon contact with a focused ion beam or an electron beam. For example, volatile organometallic precursors bearing reactive organic moieties can be used as gaseous precursors for EB- and FIB-induced deposition, with particular examples of such precursors including metal carbonyls, such as $W(CO)_6$, and metal carbonyls of cobalt and nickel. Additional examples of volatile organometallic precursors for deposition include ferrocene, $C_7H_7F_6O_2Au$, $(CH_3)_3AlNH_3$, $(CH_3)_3Al$, $C_9H_{16}Pt$, $C_7H_{17}Pt$, TMOS and TEOS. Working examples used $C_9H_{16}Pt$ as a gaseous precursor for platinum deposition and ferrocene for iron deposition. Platinum is a particularly useful material because it is an excellent electrical conductor, and iron is useful as a catalyst for carbon nanotube growth.

With continued reference to FIG. 1, step 16 indicates a coating process for depositing a layer of catalyst or catalyst precursor material on structure 10 to give structure 20. Examples of suitable coating processes include sputter-coating and spin-coating. Arrows 21 indicate the deposition of catalyst or catalyst precursor material (catalytic material) to form a layer 22 of catalytic material at least on a top portion, and perhaps substantially over pillar 14 and on a top surface portion of substrate 12. Coating 22 can be patterned by FIB to yield structure 30, which has catalyst 22 localized on substantially a top portion of pillars 14. Any technique capable of producing a desired pattern can be used in the patterning step. In working examples, pillars were patterned by FIB such that the width of each pillar ranged from about 250 nm to about 5 μm. However, pillars having smaller dimensions can be produced using an instrument having a smaller focused beam spot size, with current instruments capable of depositing pillars having a lateral dimension of about 50 nm.

Alternatively, structure 30 can be produced directly from structure 10 via step 18 by FIB-induced deposition of catalytic material 22. After deposition, materials optionally can be patterned further using FIB or another technique to further refine their features.

Steps 28 and 32 both indicate nanotube synthesis. Step 28 uses conditions that yield substantially vertical nanotubes 34 synthesized in locations defined by sites having catalyst 22 and pillars 14 yielding structure 40. Step 32 represents conditions for the synthesis of substantially horizontal nanotubes 36, which yield structure 50. Nanotubes 36 can be used to connect different sites on a substrate, for example, one or more pillars 14.

Synthesis conditions can be selected such that nanotubes 34 and 36 are a single-walled nanotube, multi-walled nanotube, or a bundle of one or both types of nanotubes. Nanotubes can be synthesized using any suitable catalyst and conditions that allow localization of catalytic material in defined locations.

Numerous catalysts and protocols for nanotube synthesis are known in the art, and the present method can be used with any known or future developed catalyst that can be localized by selective deposition and/or milling. Typically, catalysts include a metal, such as Fe, Co, Ni, Ti, Cu, Mg, Y, Zn, alloys thereof, and combinations thereof. Generally, both elemental metals and their oxides can be used to synthesize nanotubes, for example, iron, zinc and oxides of iron and zinc are useful catalysts for nanotube synthesis. Particular catalysts and conditions for nanotube synthesis can be selected based on the type of nanotubes desired. For example, Dai '526 teaches chemical vapor deposition (CVD) conditions that are suitable for the synthesis of predominantly single-walled nanotubes. Other conditions, such as those disclosed by U.S. Pat. No. 5,500,200, issued to Mandeville, et al. (Mandeville '200), tend to yield predominantly multi-walled nanotubes. Mandeville '200 is incorporated herein by reference.

Other nanotube properties that can be varied by choice of catalyst and synthesis conditions include nanotube dimensions, such as length and diameter, and nanotube orientation relative to the substrate. For example, nanotubes may be synthesized such that they are substantially aligned with one another, meaning that most nanotubes point in substantially the same direction.

In working examples, nanotube diameters were from about 1.0 to about 1.8 nm for single-walled nanotubes, from about 1.5 nm to about 3.6 nm for double-walled nanotubes and from about 10 nm to about 200 nm for multi-walled nanotubes. However, smaller-diameter nanotubes can be prepared by varying reaction conditions. For example, a high concentration of hydrogen in the synthesis yields smaller diameter nanotubes. See, Dong et al., Effects of Hydrogen on the Growth of Carbon Nanotubes by Chemical Vapor Deposition. *J. of Nanosci. and Nanotech.* 2002, 2, 155–160, (Dong), which is incorporated herein by reference.

The catalyst can be localized by milling, selective deposition or both. For example, catalytic material can be deposited by a spatially selective technique, such as FIB-induced deposition or a spatially non-selective technique, such as sputter-coating, spin-coating, physical vapor deposition and/or electrodeposition. When a non-selective process is used, the present method confers spatial selectivity by using FIB to mill the catalytic material coating from the substrate, leaving catalytic material only in defined locations. In selected working examples catalytic material was deposited by spin-coating or sputter-coating and used for nanotube synthesis following FIB milling to produce the desired pattern.

One example of a liquid phase catalyst precursor ($AlCl_3.6H_2O$, $SiCl_4$, $FeCl_3.6H_2O$, $MoO_2Cl_2$) suitable for spin-coating the substrate is taught by Cassell, et al., *J. Am. Chem. Soc.* 1999, 121, 7975, (Cassell) and by U.S. Pat. No. 6,401,526, issued to Dai et al., (Dai '526), both of which are incorporated herein by reference. In a working example, such liquid phase catalyst precursors were spin-coated on the surface of a substrate, and the FIB was used to pattern the coating, thereby forming a pattern of catalyst-coated area. Thus, the catalyst coating can be patterned or milled such that the catalyst is in a defined location, such as on the top of metal pillars. Nanotubes can then be synthesized in defined locations. In one embodiment, individual catalyst particles on the substrate surface can be imaged using a high resolution FIB microscope or a dual beam FIB system having an electron microscope. Because individual catalyst particles can be visualized, individual particles can be removed. This approach enables precise catalyst milling so that a high-resolution catalyst array is produced.

FIG. 2A illustrates a field emission array, which uses nanotube field emitters as electron emission sources. Such nanotube field emitter arrays can be fabricated according to the method disclosed herein. In such an array, substrate 72 includes cathodes 74, which can optionally be deposited and/or patterned according to embodiments of the method, connected to nanotubes 78, which are synthesized using catalytic material 76. Nanotubes 78 are substantially vertically aligned and directed at the anode (not shown), which is coated with phosphor. Nanotubes 78 preferably are synthesized under conditions that provide substantially vertically aligned nanotubes. If a method that does not provide selective synthesis of vertically oriented nanotubes is used, undesired nanotubes optionally can be removed via FIB-milling.

FIG. 2B depicts an array of substantially horizontal nanotubes 88 synthesized using catalyst 86 and connecting pillars 84 formed on substrate 82.

FIG. 2C depicts a nanotube transistor device 90. Source pillar 94 and drain pillar 97 are deposited on insulating substrate 92 to provide connection to underlying source and drain circuitry, respectively (not shown). Gate 95 is formed by depositing a metal on the insulating substrate 92 having gate circuitry (not shown). Catalytic material 96 is deposited on source 94 and drain 97, and nanotube 98 is synthesized therebetween. Alternatively, catalytic material 96 is deposited on only one of source 94 or drain 97 prior to nanotube synthesis with the nanotube being synthesized between the source and the drain so that the source and drain are electrically connected. Even though the site of nanotube synthesis is defined by the catalyst locations the direction of nanotube growth is not necessarily predetermined and thus nanotubes may be synthesized that do not connect the two desired points. However, with respect to FIG. 2C, for example, nanotubes that do not connect source 94 and drain 97 can be removed via FIB milling so that only the nanotubes having the desired connectivity remain.

Device 90 is one example of a device that can be assembled according to the method disclosed herein. Other devices will be readily apparent to those of ordinary skill in the art in view of the present disclosure. For examples of transistors using nanotubes, see: Tans et al., *Nature,* 1998, 393, 49; and Collins et al., *Science,* 2001, 292, 706–709, both of which are incorporated herein by reference.

FIG. 3 illustrates second method for synthesizing nanotubes in defined locations. With reference to structure 100, catalytic material 104 is deposited at defined locations on substrate 102 via FIB-induced deposition. Nanotubes can be synthesized in the locations defined by the catalytic material 104 according to steps 106 or 108, which represent protocols for substantially vertical nanotube synthesis and substantially horizontal nanotube synthesis, respectively.

FIG. 4 depicts the preparation of an exemplary nanotube field emitter device 130. Specifically, V-shape 122 represents a tungsten filament, attached to molybdenum posts 124, inserted through ceramic base 126. Tungsten was chosen for V-shape 122 in working embodiments because it is a refractory, high melting point, relatively inert material. Moreover, tungsten can be shaped by, for example, electrochemical sharpening, to give a sharpened tip. In working embodiments molybdenum was used for posts 124, because it is a high melting point, dimensionally stable, machinable material. However, other materials having similar properties also can be used for posts 124. Catalyst can be selectively deposited on the tip of V-shaped filament 122 via FIB-mediated deposition. Nanotube 132 can be synthesized on the catalyst-coated tip to yield nanotube field emitter 130. In operation, structure 130 is a high brightness, high-aspect-ratio, field emitter, which uses nanotube 132 as an electron emission source. Using a nanotube as the field emission cathode results in a smaller virtual source size, and the nanotube field emitter device 130 is useful, for example, as a source for a field emission microscope. Jiao et al., characterized the electron field emission properties of such a field emitter. See, *Mat. Res. Soc. Symp. Proc.* 2002, 706, 113–117, which is incorporated herein by reference.

Unless otherwise specified, nanotubes were synthesized according to the present procedure under CVD conditions as is known to those of ordinary skill in the art. CVD, by itself, is a spatially non-selective process. However, features of the present method render CVD spatially selective, and in working examples, CVD is used to selectively synthesize nanotubes in defined locations. Thus, in one aspect, FIB patterning of a catalyst confers selectivity upon the synthesis of nanotubes using CVD.

Working embodiments used the following CVD procedure. First, a substrate having a catalyst patterned thereon was inserted into the CVD reaction chamber. The reactor was evacuated by a mechanical pump, with working embodiments evacuating to a base pressure of $3 \times 10^{-2}$ torr. A quartz tube CVD chamber was used in working examples; however, any CVD reaction chamber can be used. The substrate was heated sufficiently to activate the catalyst, such as to a temperature of 700° C. Gas purging also is typically used to facilitate catalyst activation. Gases suitable for purging include ammonia, hydrogen, nitrogen and argon. In working embodiments hydrogen gas was introduced into the heated reaction chamber at 325 standard cubic centimeters per minute (sccm) for 15 minutes. The substrate temperature was then increased to 800° C. as measured by a thermocouple. At this temperature, an admixture of acetylene and hydrogen at a volume ratio of 1:13 was introduced into the reactor. Acetylene functions as a carbon source and other carbon sources are well known and can be used in conjunction with features of the present method. Examples of other suitable carbon sources include, without limitation, methane, methanol, ethane, ethanol, ethylene and the like. Working embodiments used either methane or acetylene. Without limitation to theory, it is believed that the hydrogen gas introduced with the carbon source acts as a diluent for the carbon source and prevents catalyst poisoning by excess carbon. When complete catalyst poisoning occurs, typically few or no nanotubes are synthesized. When partial catalyst poisoning occurs, other species, such as amorphous carbon is produced. The flow rates of acetylene and hydrogen were kept at 25 sccm and 325 sccm, respectively, for 15 minutes. The total pressure in the reactor during nanotube growth was 76 torr. These specific conditions are exemplary only and can be varied as is known to those of ordinary skill in the art.

These conditions primarily yield multi-walled nanotubes, which are preferred for a single nanotube field emitter device. Generally, diameters of multi-walled nanotubes ranged from about 10 nm up to about 200 nm in working examples; however, multi-walled nanotubes having diameters of from about 8 nm up to about 1 µm can be prepared. In some cases methane was used as the carbon source for nanotube synthesis. When methane was used as the carbon source, single-walled and double-walled nanotubes were prepared in the same synthesis. The diameter of single-walled and double-walled nanotubes produced was in the range from about 1.0 to about 1.8 nm and from about 1.5 to about 3.6 nm, respectively. However, single walled nanotubes can be produced having diameters of from about 1 to about 10 nm and double walled nanotubes can be produced having diameters from about 1 to about 20 nm.

EXAMPLES

The following examples are provided to illustrate certain particular embodiments of the disclosure. It should be understood that additional embodiments not limited to those particular features described are consistent with the following examples.

Each of the following examples was performed using a FEI FIB 611 system.

Example 1

Figure 7:
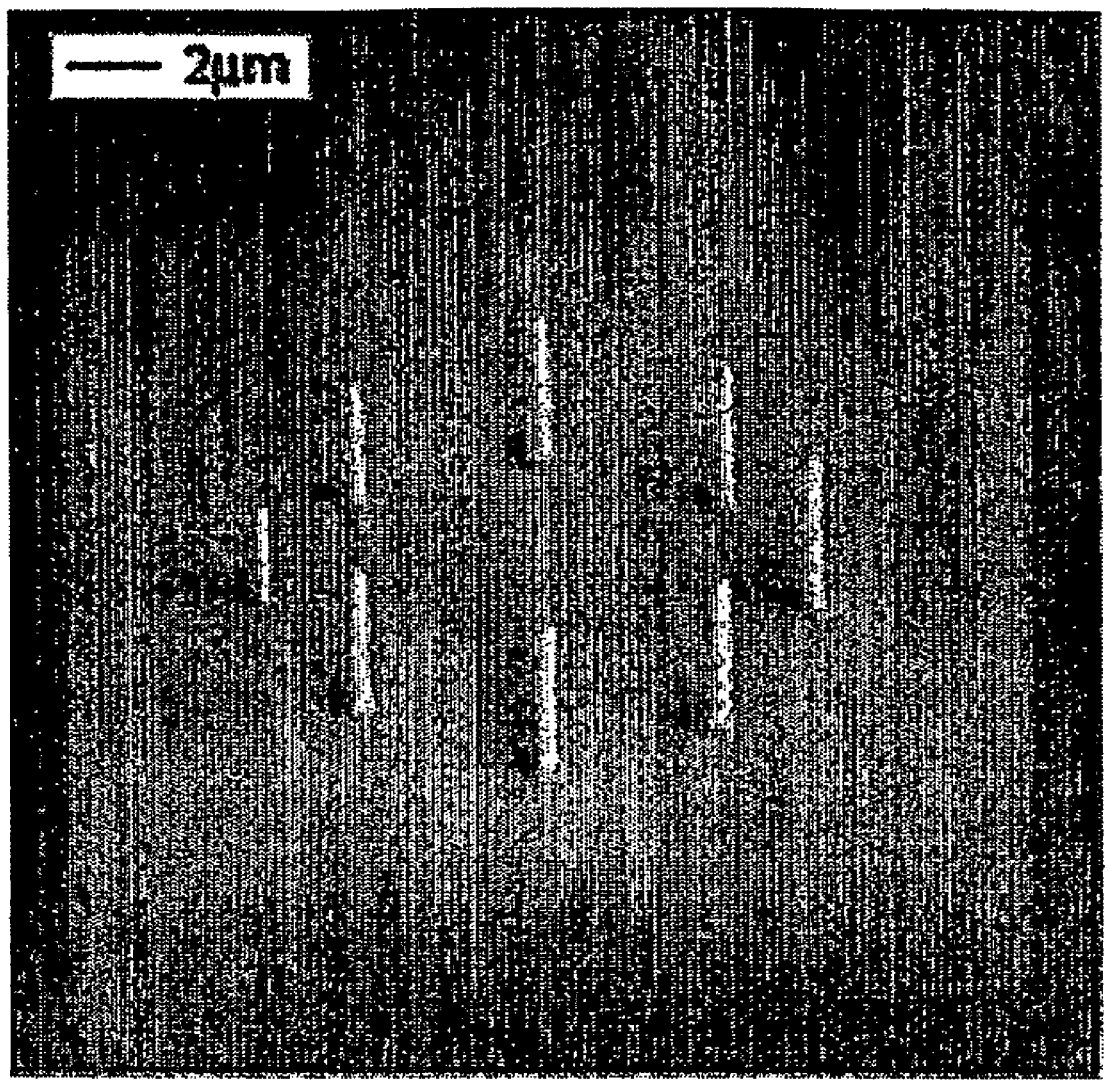
FIG. 7 is a digital image illustrating an array of Pt pillars of cylindrical shape formed by FIB-induced deposition.
Figure 8:
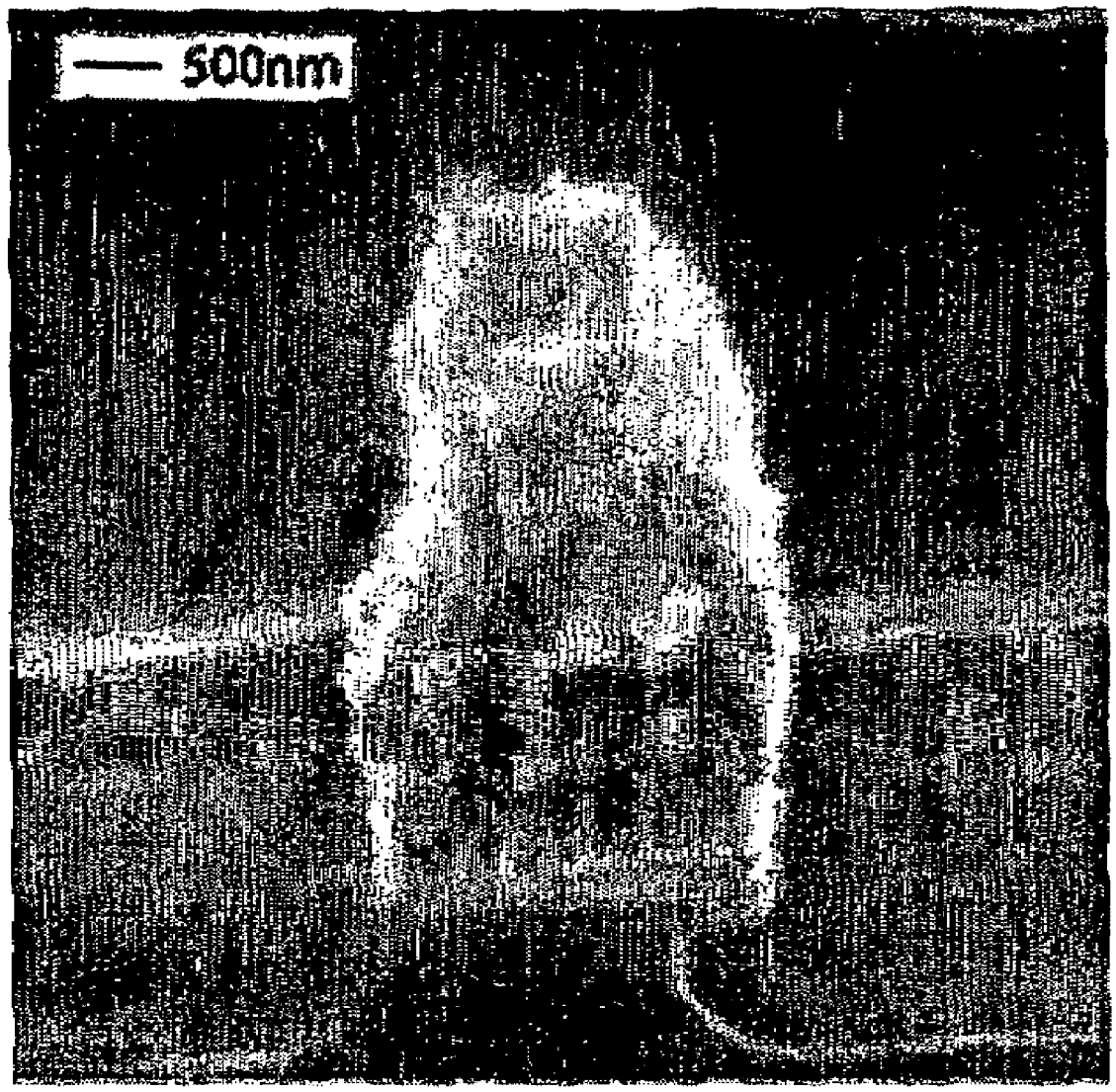
FIG. 8 is a digital image (scale of 500 nm provided in upper left) of a bundle of nanotubes synthesized on a Pt pillar.

This example describes FIB-induced deposition of Pt pillars. Images of the pillars prepared according to this example are shown in FIG. 7. In this process, the Pt pillars were deposited on a silicon substrate by injecting a gaseous compound ($C_9H_{16}Pt$) via the capillary needle-sized nozzle of the gas-injection apparatus. A current of 2 picoamperes (pA) was used, the magnification of deposition was 20,000×, and the pillars were patterned in a box radius of 0.03 micrometers (µm), using a 99% overlap within each box. The deposition time was 5:00 minutes per pillar deposited in series.

Example 2

This example describes FIB-induced deposition of Pt pillars. In this process, the Pt pillars were deposited on a substrate by injecting a gaseous compound ($C_9H_{16}Pt$) via the capillary needle-sized nozzle of the gas-injection apparatus. A current of 6 pA was used, the magnification of deposition was 10,000×, and the pillars were patterned in a box width of 1.0 µm with a 50% overlap within each box. To deposit the pillars evenly, the substrate was rotated 180° relative to the source after 5:30 minutes, 3:30 minutes and 1:30 minutes for each pillar deposited in series.

Example 3

This example describes deposition and patterning of a catalyst on the pillar arrays prepared according to Example 1. The patterned substrate of Example 1 was coated with a thin layer of Co via sputter-coating for 90 seconds at 32 milliamperes (mA). The Co coating was patterned via FIB sputtering (500 pA), such that Co remained only on the top pillar surfaces. The FIB-patterned substrate was then placed in a CVD reactor, and carbon nanotubes were synthesized by the catalytic thermal decomposition of acetylene.

Example 4

This example describes coating a substrate using a liquid catalyst precursor. The liquid catalyst precursor was prepared according to the procedure of Cassell et al. *J. Am. Chem. Soc.* 1999, 121, 7975. The catalyst precursor contained inorganic chloride precursors ($AlCl_3.6H_2O$, $SiCl_4$, $FeCl_3.6H_2O$, $MoO_2Cl_2$), a removable triblock copolymer (P-103) serving as the structure directing agent for the chlorides, and an alcohol mix (EtOH/MeOH) for dissolution of the inorganic and polymer compounds. The liquid catalyst precursor was then spin-coated on the surface of a porous silicon substrate. A 25 microliter (µL) aliquot of liquid catalyst precursor was deposited on the surface of the substrate. After 30 seconds the substrate was spun at 5,000 rpm for 5 seconds to spin-coat the substrate. A second 25 µL aliquot of catalyst precursor was then delivered to the substrate while spinning for 5 more seconds at 5,000 rpm. The substrate was baked at 75° C. for 15 minutes. The focused ion beam was then used to sputter the substrate surface to create a pattern in which some areas remained coated with catalyst and others did not. The substrate was placed in a CVD reactor, and carbon nanotubes were synthesized by the catalytic thermal decomposition of acetylene.

Example 5

This example describes the preparation of a 3×4 array of Pt pillars with an indentation in the top surface of each pillar. The indentations are useful for controlling the direction of nanotube growth.

Figure 6A:
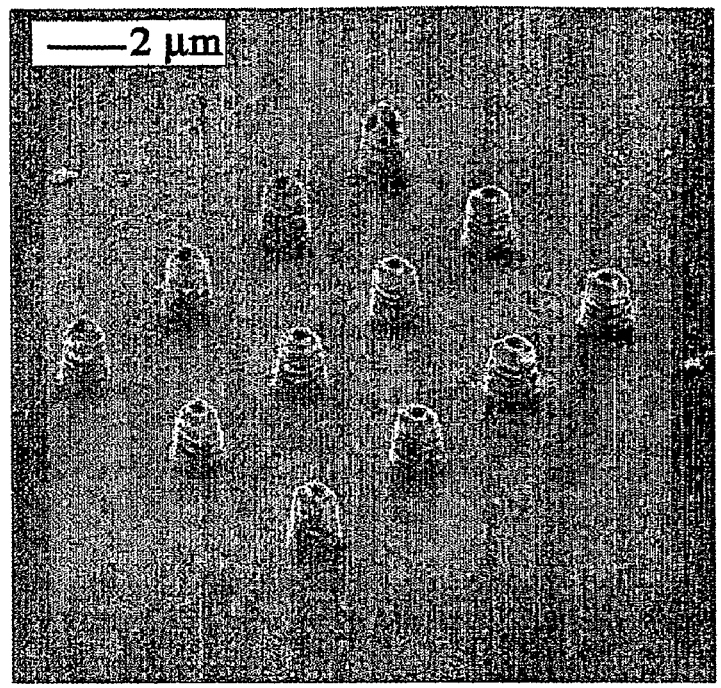
FIG. 6A is a digital image illustrating a 3×4 array of Pt pillars on a substrate, each pillar having an indentation formed by FIB milling of the top surface of the pillars.
Figure 6B:
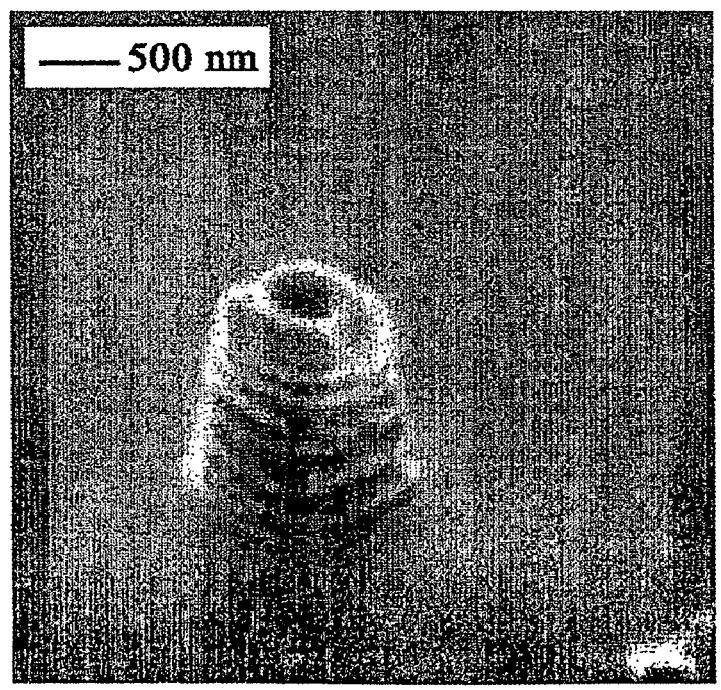
FIG. 6B is a digital image illustrating a single pillar of FIG. 6A.

A 3×4 array of pillars was deposited using a current of 5 pA, a dwell time per beam step of 5.0 µs, 99% beam diameter overlap per step and using an approximately 7 µm field of view magnification. Following deposition of the array, an indentation was milled in the top of each pillar using the same conditions as the deposition, except a 0.5×0.5 µm filled box pattern was used, and each indentation was milled for 30 seconds. FIGS. 6A and 6B show the array and a representative member, respectively. Such pillars having indentations aid the synthesis of substantially aligned nanotubes.

Example 6

This example describes the FIB-mediated deposition of iron for nanotube synthesis using ferrocene as a gaseous precursor. Prior to iron deposition the silicon substrate was ultrasonically cleaned in acetone for 15 minutes. After drying, the substrate was mounted on an aluminum sample holder using copper tape and placed into the FIB apparatus. Ferrocene powder was inserted into a gas injection crucible that is connected to a needle placed inside the vacuum chamber of a FEI 611 FIB apparatus. The gas injection needle was aimed at the silicon substrate and the crucible was heated to 48° C. To deposit a 1 µm by 1 µm area of iron beam current was maintained at 64 pA, the dwell time per beam step was 0.6 µs, the beam diameter overlap per step was 0%, and the distance (d) from needle to substrate was 100 µm. Iron pillars having various dimensions were deposited by this procedure using different parameters. For example, 3 µm by 3 µm pillars were deposited using a beam current of 500 pA, a dwell time per beam step of 0.5 µs, a beam diameter overlap per step of 0% and d was 100 µm.

Example 7

This example describes a method for assembling carbon nanotube field emitters by directly synthesizing carbon nanotubes on the tip of a sharpened tungsten wire. Pure tungsten wire of 0.1 mm diameter was electrochemically sharpened to a tip diameter on the order of 1 µm, using a 2.5 M solution of KOH-$H_2O$, with a nickel strip as a cathode. A voltage source and a multimeter were connected to the circuit, which passed a current through the tungsten tip as it was suspended in the solution. After a survey of various voltages, it was determined that the most sturdy tip geometry seems to result with 15V. At this voltage, the reaction rate between the tungsten and the KOH solution was the most rapid. After approximately 2.5 minutes, the submerged section of tungsten fell off and the current dropped sharply, at which point the tungsten tip was removed.

The sharpened tip was spot-welded to a V-shaped tungsten wire where it had been spot-welded to a field-emission-microscope base of ceramic or glass. This assembly would serve as the substrate for the carbon nanotube emitters.

To grow carbon nanotubes on this substrate, the sharpened tungsten tip was carefully dipped into a liquid catalyst containing EtOH, MeOH, $AlCl_3 \cdot 6H_2O$, $SiCl_4$, $FeCl_3 \cdot 6H_2O$, $MoO_2Cl_2$, and P-103 (a removable triblock copolymer). The substrate was then inserted into the chemical vapor deposition reactor. The nanotube growth was accomplished by the catalytic decomposition of acetylene with a flow rate of 25 sccm. The reaction chamber was kept at 76 torr and the temperature of the reaction stage was maintained at 800° C.

Figure 5A:
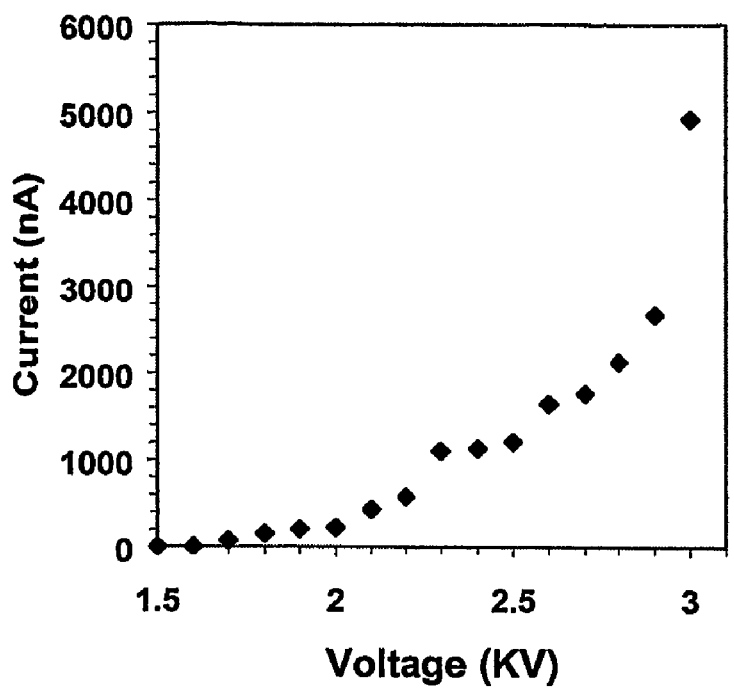
FIG. 5A is a graph of current vs. voltage behavior for a nanotube field emitter fabricated according to Example 7.
Figure 5B:
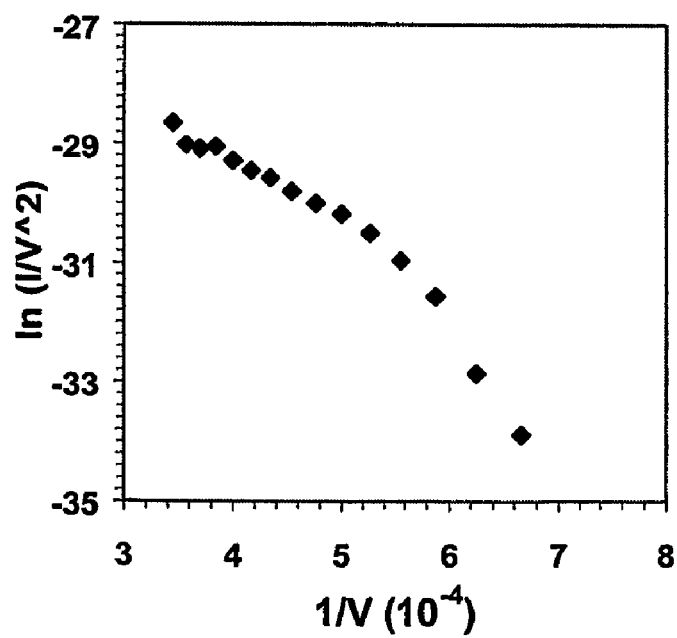
FIG. 5B is a Fowler-Nordheim plot for a nanotube field emitter fabricated according to Example 7.

Field emission characteristics of field emitters made according to this example are provided by FIGS. 5A and 5B. The field emission experiments were performed in a field emission microscope (FEM) system with a base pressure of ~1×10$^{-9}$ Torr. The typical pressure in the FEM chamber during the measurement was ~1×10$^{-7}$ to 10$^{-8}$ Torr. The FEM configuration has a point-to-plane electrode geometry. For the anode, a glass plate covered with indium-tin-oxide (ITO) was used, with a layer of phosphor deposited over the ITO. The distance between the nanotube emitters (cathode) and the phosphor screen (anode) was approximately 12 cm. The tungsten filament support (carbon nanotube emitter substrate) was attached to a current-regulated heating supply to clean the field emitter. The field emission images and the current-voltage (I-V) behaviors of the nanotube emitters were obtained by applying a negative dc voltage up to 3,000 V. Emission current measurements were recorded using a digital data acquisition software (Test-Point) in a personal computer, which allows construction of both a time-averaged I-V response and current versus time plot at each voltage. The field emission images produced on the phosphor screen were imaged using a digital camera and recorded continuously on videotapes. See, Jiao et al. *Mat. Res. Soc. Symp. Proc.* 2002, 706, 113–117.

Example 8

This example describes the synthesis of nanotubes using different conditions and the correlation of their resulting different internal structures with their field emission properties. Nanotubes were synthesized on the substrates according to the CVD procedure discussed above. The internal structures of the nanotubes were analyzed by high-resolution transmission electron microscopy (HRTEM), and the field emission characteristics of nanotubes characterized by a field emission microscope.

Analysis of the internal structures of the nanotubes by HRTEM revealed that the nanotubes synthesized using iron, cobalt and nickel with the introduction of hydrogen during the nanotube growths had an average diameter of about 10 nm.

However, the nanotubes formed using iron and cobalt catalysts exhibited better graphitization (crystallization of carbon) than the nanotubes prepared using nickel. The material prepared using iron without introduction of hydrogen gas during the synthesis included amorphous carbon particles as well as carbon nanotubes. The nanotubes formed under the hydrogen-free conditions had an average diameter of about 45 nm. Specifically, the nanotubes prepared using iron catalysts in the presence of hydrogen comprised straight graphite layers aligned parallel to the tube axis. Moreover, little amorphous carbon was observed on the outer surface of the nanotubes. Field emission characteristics of carbon nanotubes prepared by different catalysts are quite different. As indicated in Table 1, carbon nanotubes synthesized with the presence of iron catalyst exhibited a low turn-on field and a low threshold field.

TABLE 1

| Type of nanotube (catalyst used) | Turn-on field (V/μm) | Threshold field (V/μm) | Amplification factor |
|---|---|---|---|
| Fe | 0.35 | 2.8 | 2300 |
| Co | 0.4 | 3 | 2600 |
| Ni | 5 | 9 | 1500 |
| Fe (without using $H_2$) | 9 | 14 | 700 |

Example 9

This example describes the formation of ZnO nanowires on tungsten substrates. Such nanowires are useful as field emitter devices. Using a vapor transport method, ZnO nanowires were selectively synthesized on tungsten tips and on tungsten plates. In both cases a thin film of Au catalyst was deposited and patterned in desired locations. The angular intensity and fluctuation of the field emission current from the ZnO nanowires synthesized on tungsten tips was similar to those observed for similar field emitters prepared using carbon nanotubes. A self-destruction limit of about 0.1 mA/sr for angular intensity was observed, and the power spectra showed a $1/f^{3/2}$ characteristic from 1 Hz to 6 kHz. See, Dong et al. *Appl. Phys. Lett.* 2003, 82, 1096–1098.

The present invention has been described with reference to preferred embodiments. Other embodiments of the invention will be apparent to those of ordinary skill in the art from a consideration of this specification, or practice of the invention disclosed herein. It is intended that the specification and examples be considered as exemplary only, with the true scope and spirit of the invention being indicated by the following claims.

We claim:

1. A composite, comprising:
   a substrate;
   a pillar formed on the substrate at a selected location comprising an insulating, semiconducting or conducting material, the pillar further comprising a catalyst; and
   a nanoscale structure formed on the pillar, wherein the substrate comprises plastic, silicon nitride, quartz, or mica, or combinations thereof, the pillar comprises Pt, Au, Fe, Ni, Ti, or combinations thereof, and the nanoscale structure comprises zinc oxide, cadmium sulfide, silicon dioxide, or combinations thereof.

2. The composite according to claim 1 where the nanoscale structure comprises a nanotube.

3. The composite according to claim 2 where the nanotube is a carbon nanotube.

4. The composite according to claim 1 where the pillar comprises a semiconducting material.

5. The composite according to claim 1 where the pillar comprises a metal selected from the group consisting of W, Pt, Au, Al, Fe, Ni, Ti, Ta, Cu, and combinations thereof.

6. The composite according to claim 1 where the pillar is electrically connected to an electronic device.

7. The composite according to claim 1 further comprising a catalyst deposited on the pillar for synthesis of the nanoscale structure.

8. The composite according to claim 1 where the substrate is silicon, and the pillar is platinum.

9. The composite according to claim 3 where the nanotube has a diameter of from about 1 to about 200 nm.

10. The composite according to claim 3 where the nanotube has a diameter of from about 1 to about 100 nm.

11. The composite according to claim 1 where the composite forms a field emitter device where the pillar comprises a tungsten tip and a nanotube is formed on the tip.

12. The composite according to claim 11 where the device has a single field emitter.

13. The composite according to claim 12 where the nanoscale structure is a nanotube having a diameter of from about 10 to about 1000 nm.

14. The composite according to claim 1 where the composite forms a device having at least two terminals.

15. The composite according to claim 14 where the composite forms a transistor.

16. The composite according to claim 15 where the nanoscale structure is a nanotube having a diameter of from about 1 about 10 nm.

17. The composite according to claim 1 where the substrate includes at least one of a metal, ceramic, plastic or a semiconductor.

18. The composite according to claim 1 where the substrate includes at least one of silicon, silicon nitride, quartz and mica.

19. The composite according to claim 1 where the nanoscale structure comprises at least one of carbon, zinc oxide, cadmium sulfide and silicon dioxide.

20. The composite according to claim 19 where the nanoscale structure is a ZnO nanowire.

21. The composite according to claim 20 where the ZnO nanowire functions as a field emitter.

22. The composite according to claim 1, further comprising plural pillars arranged on the substrate in a selected pattern; and plural nanoscale structures formed on the pillars.

23. The composite according to claim 22 where at least one pillar forms an electrical connection to a circuit formed on the substrate.

24. The composite according to claim 22 where the pillars have a width of from about 10 nm to about 1 μm.

25. The composite according to claim 22 where the plural nanoscale structures form a field emitter device.

26. The composite according to claim 22 where each pillar is associated with one pixel in a flat panel display.

27. The composite according to claim 26 where a single carbon nanotube is formed on each pillar.

28. The composite according to claim 27 where the nanotubes have a diameter of from about 1 to about 200 nm.

29. The composite according to claim 26 where a single ZnO nanowire is formed on each pillar.

30. The composite of claim 1 wherein the pillar comprises a first material and the substrate comprises a second material.

\* \* \* \* \*